United States Patent
Mody et al.

(10) Patent No.: US 12,081,687 B2
(45) Date of Patent: Sep. 3, 2024

(54) FOLDING CASE FOR MOBILE ELECTRONIC DEVICE

(71) Applicant: CASE-MATE, INC., Atlanta, GA (US)

(72) Inventors: Saumil Chetan Mody, Atlanta, GA (US); Cole David Dobson, Atlanta, GA (US)

(73) Assignee: Case-Mate, Inc., Atlanta, GA (US)

( * ) Notice: Subject to any disclaimer, the term of this patent is extended or adjusted under 35 U.S.C. 154(b) by 78 days.

(21) Appl. No.: 17/694,762

(22) Filed: Mar. 15, 2022

(65) Prior Publication Data
US 2023/0300228 A1    Sep. 21, 2023

(51) Int. Cl.
*H04M 1/02*    (2006.01)

(52) U.S. Cl.
CPC ......... *H04M 1/022* (2013.01); *H04M 1/0266* (2013.01); *H04M 2250/16* (2013.01)

(58) Field of Classification Search
CPC . H04M 1/022; H04M 1/0266; H04M 2250/16
See application file for complete search history.

(56) References Cited

U.S. PATENT DOCUMENTS

| | | | | |
|---|---|---|---|---|
| 6,831,229 B1 * | 12/2004 | Maatta | ................ | H05K 5/0226 174/67 |
| 9,348,450 B1 * | 5/2016 | Kim | .................... | H04M 1/0268 |
| 9,791,892 B2 * | 10/2017 | Park | ...................... | G06F 1/1681 |
| 10,064,298 B2 | 8/2018 | Cavenagh | | |
| 10,314,185 B2 | 6/2019 | Cavenagh | | |
| 11,116,300 B2 * | 9/2021 | Mody | .................. | A45C 13/007 |
| 11,231,754 B2 * | 1/2022 | Kang | .................... | H04M 1/022 |
| 11,647,819 B2 * | 5/2023 | Mody | ..................... | A45C 11/00 224/191 |
| 2012/0236483 A1 * | 9/2012 | Watanabe | ............... | G09G 3/36 361/679.01 |
| 2017/0061836 A1 * | 3/2017 | Kim | ...................... | G06F 1/1626 |
| 2018/0292863 A1 * | 10/2018 | Escamilla | ............ | G06F 1/1647 |
| 2018/0295736 A1 | 10/2018 | Cavenagh | | |
| 2019/0011955 A1 * | 1/2019 | Stewart | ................ | G06F 1/1652 |

(Continued)

FOREIGN PATENT DOCUMENTS

KR    200493571 Y1 *    4/2021    ........... A45C 13/005

OTHER PUBLICATIONS

Translation of KR-200493571-Y1 (Year: 2021).*
Amazon.com: araree Nukin 360 Compatible with Samsung Galaxy Z Fold 2 5G Cover Clear Transparent Surrounding Hinge Part.

*Primary Examiner* — Lewis G West
(74) *Attorney, Agent, or Firm* — Perilla Knox & Hildebrandt LLP

(57) ABSTRACT

A foldable case for foldable mobile electronic devices. The foldable case generally comprises a first shell and a second shell hingedly connected to a third shell. The foldable case is reconfigurable between a closed configuration, an open configuration, and intermediate configurations therebetween. The first, second and third shells comprise cooperative engagement features which allow the first and second shells to hinge or pivot relative to the third shell. The cooperative engagement features also constrain the first and second shells to the third shell and limit the first and second shells to pivotal movements in the open and closed configurations but allow lateral movements in the intermediate configurations.

20 Claims, 2 Drawing Sheets

(56) References Cited

U.S. PATENT DOCUMENTS

| | | | |
|---|---|---|---|
| 2020/0229566 A1* | 7/2020 | Mody | A45C 11/00 |
| 2021/0026407 A1* | 1/2021 | Park | H04M 1/0268 |
| 2021/0034116 A1* | 2/2021 | Torres | G06F 1/1616 |
| 2021/0393008 A1* | 12/2021 | Mody | A45C 13/007 |
| 2022/0035410 A1* | 2/2022 | Lee | G06F 1/1683 |
| 2022/0091635 A1* | 3/2022 | Ou | G06F 1/1616 |
| 2022/0171440 A1* | 6/2022 | Lee | G06F 1/1637 |
| 2022/0353354 A1* | 11/2022 | Song | H04M 1/0216 |
| 2023/0046401 A1* | 2/2023 | Mitchell | E05D 15/56 |
| 2023/0102883 A1* | 3/2023 | Chung | A45C 11/00 455/575.8 |

* cited by examiner

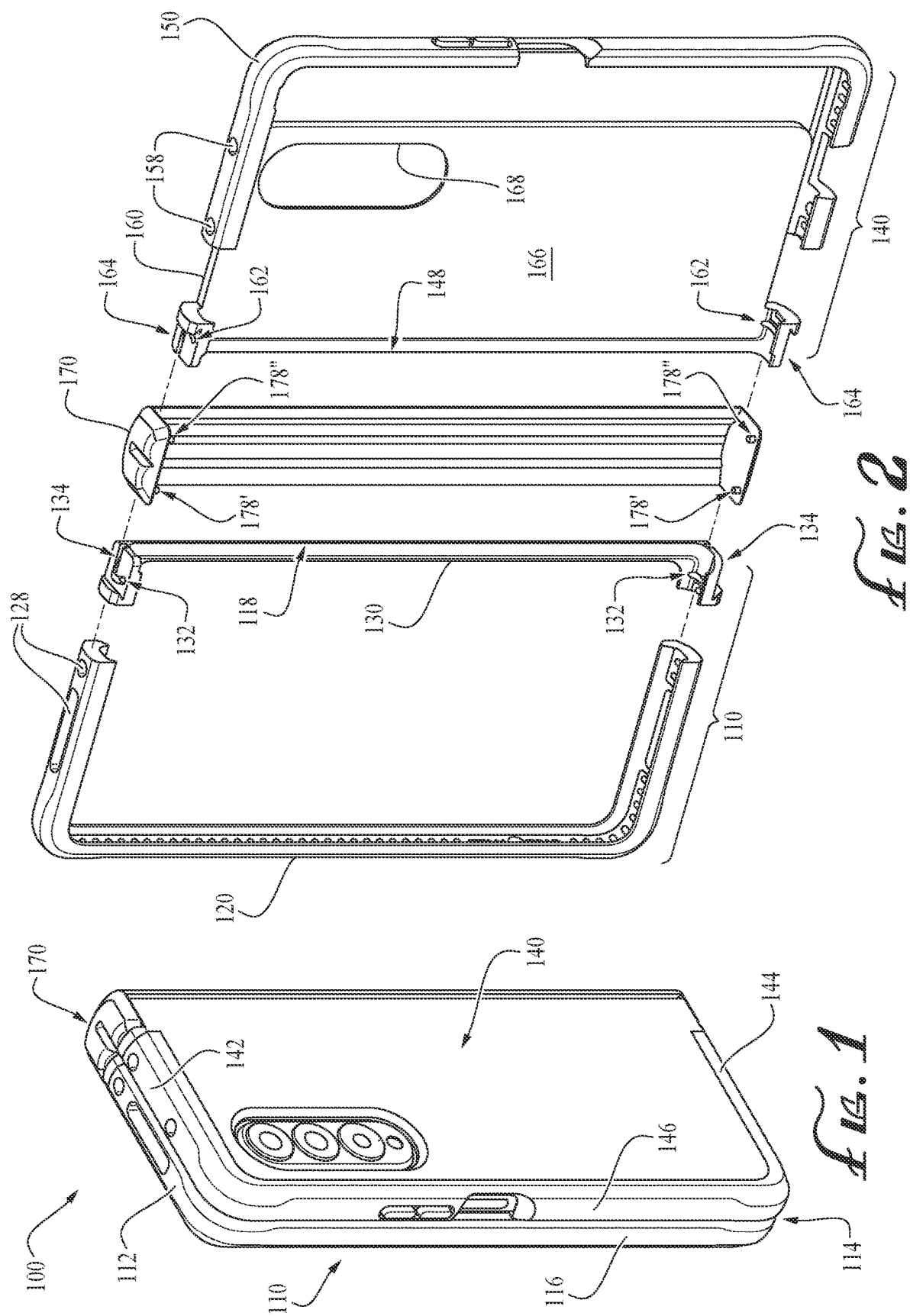

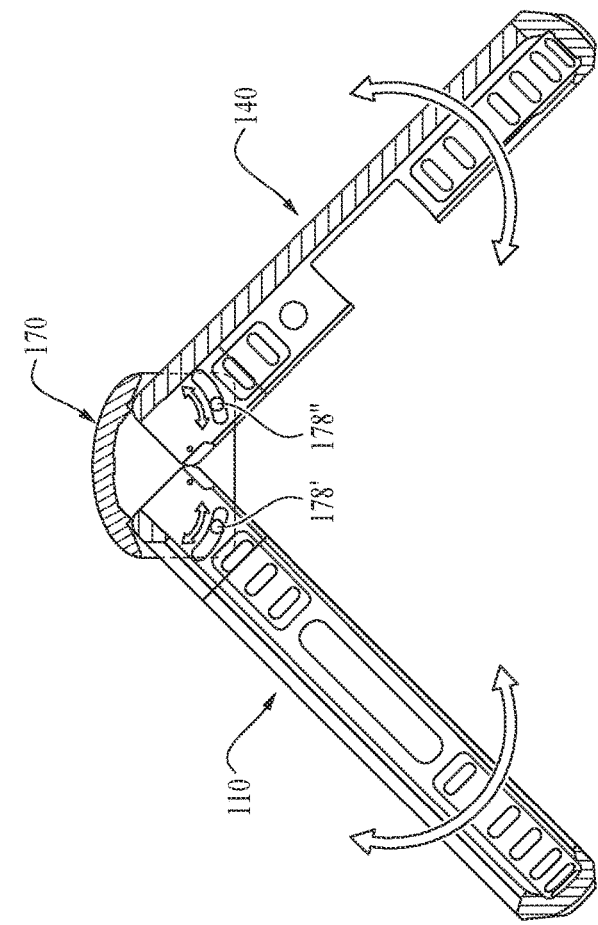
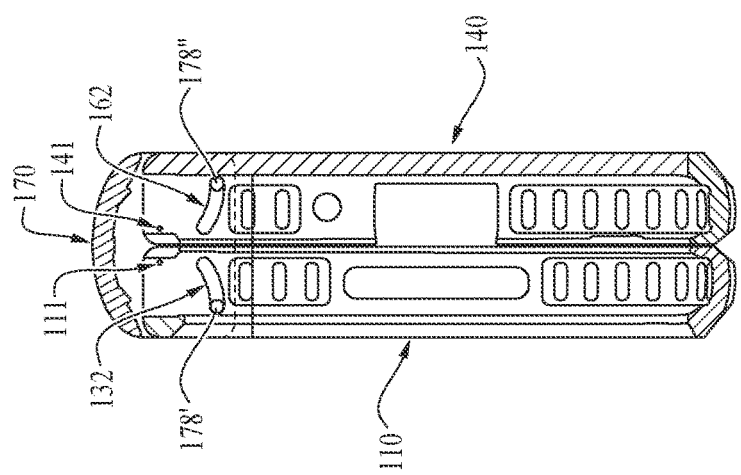
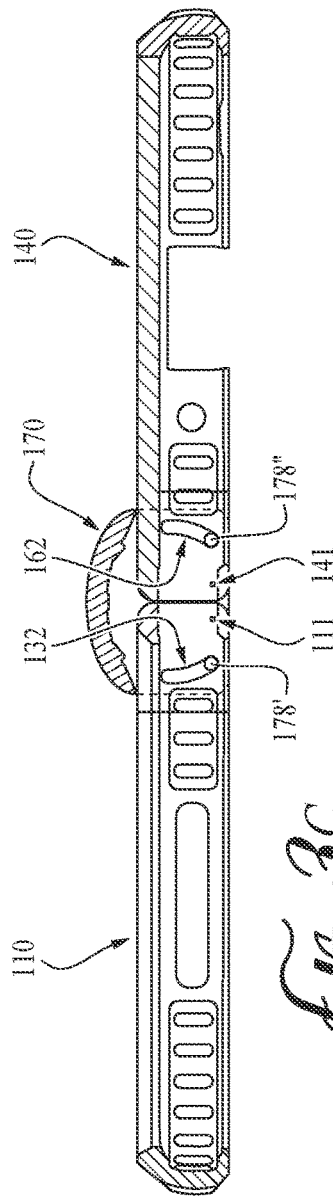

FOLDING CASE FOR MOBILE ELECTRONIC DEVICE

TECHNICAL FIELD

The present invention relates generally to the field of protective cases for mobile electronic devices and more particularly to folding protective cases for folding mobile electronic devices.

BACKGROUND

Mobile electronic devices, such as smart phones, tablets, or the like, typically include displays and other parts susceptible to damage from accidents and mishandling. Protective cases and covers help protect these devices from damage and are generally known. But, cases configured for use with conventional non-folding or non-foldable devices are not compatible with foldable devices and thus cannot be used to protect foldable devices. With the growth of foldable mobile electronic devices, continuing improvements in the field of foldable cases and covers for foldable mobile electronic devices are sought. It is to the provision of a folding/foldable case for fitting a foldable mobile electronic device that the present invention is primarily directed.

SUMMARY

In example embodiments, the present invention provides a protective case or cover for a foldable mobile electronic device having two device bodies or housings hingedly connected to one another by a hinge or flexible connector. The protective case includes a first shell portion and a second shell portion hingedly connected to a third shell portion. The first and second shell portions are secured or otherwise engaged over the two device bodies. The third shell portion is secured to the first and second shell portions and covers the hinge or flexible connector of the mobile electronic device. The first, second and third shell portions include cooperative engagement features which allow the first and second shell portions to pivot relative to the third shell portion. In example embodiments, the protective case is configured to fold and unfold with the foldable mobile electronic device.

In one aspect, the present invention relates to an electronic device case reconfigurable between a closed configuration and an open configuration. The electronic device case includes a first shell, a second shell, and a hinge cover. The first shell includes at least one hinge slot and a first hinge axis. The second shell includes at least one hinge slot and a second hinge axis. The hinge cover connects the first and second shells to one another and includes at least one hinge protrusion configured for cooperative engagement with at least one of the hinge slots.

In example embodiments, the hinge cover is an elongate member extending between a first end and a second end. The hinge cover includes transverse walls extending transversely from each of the first and second ends. The transverse walls comprise at least one pair of axially aligned hinge protrusions.

In example embodiments, the first shell comprises an outer frame portion defining an outer edge and an inner frame portion defining an inner edge opposite the outer edge. Similarly, the second shell comprises an outer frame portion defining an outer edge and an inner frame portion defining an inner edge opposite the outer edge. In example embodiments, the outer edges of the first and second shells comprise one or more raised sidewalls whereas the inner edges define openings or clearances for sliding portions of an electronic device therethrough.

In example embodiments, the hinge slots are arcuate in shape and substantially radial to the inner edges of the first and second shells. In other words, the hinge slots have radial profiles defined by a radius relative to the inner edges of the first and second shells.

In example embodiments, the first and second hinge axes are distal from the hinge slots. In other words, the first and second hinge axes are spaced a distance from the hinge slots. When moved between the closed and open configurations, the hinge axes move laterally towards and away from the hinge cover.

In example embodiments, at least one of the first shell, second shells, or hinge cover is transparent or translucent.

In another aspect, the invention relates to a folding case for a foldable mobile phone. The folding case includes a hinge cover having a first and a second pair of axially aligned projections, a first shell having a peripheral sidewall with a first pair of axially aligned elongate slots, and a second shell having a peripheral sidewall with a second pair of axially aligned elongate slots. The first and second pairs of elongate slots are positioned or provided along the peripheral sidewalls and are configured to receive the first and second pairs of axially aligned projections, respectively. According to example embodiments, the first shell is pivotable about a first pivot axis distal from the first pair of axially aligned projections and the second shell is pivotable about a second pivot axis distal from the second pair of axially aligned projections.

In example embodiments, the folding case is reconfigurable between a closed configuration and an open configuration. According to example embodiments, the pivot axes move laterally away from the hinge cover as the folding case is manipulated from the closed configuration to the open configuration. Conversely, the pivot axes move laterally toward the hinge cover as the folding case is manipulated from the open configuration to the closed configuration.

In example embodiments, the first and second shells include outer frame portions comprising elastomeric materials and inner frame portions comprising rigid materials. In some example embodiments, all or at least a portion of one or both of the first and second shells are translucent or transparent.

In some example embodiments, the second shell further includes a base panel defined by the peripheral sidewall.

Optionally, the peripheral sidewalls may include one or more apertures for accessing for example user interactive features on the foldable mobile phone.

In yet another aspect, the invention relates to a foldable protective cover for foldable mobile electronic device with a first display portion hingedly connected to a second display portion. The foldable protective cover includes a first shell portion and a second shell portion for fitting over the first and second display portions of the foldable mobile electronic device, respectively. Each of the first and second shell portions include inner and outer edges wherein the inner edges of the first and second shell portions are rotatably connected to a third shell portion. The first and second shell portions further include arcuate openings for receiving projections extending from the third shell portion. Moreover, each of the first and second shell portions also include an axis of rotation distal from the arcuate openings and projections.

In example embodiments, the outer edges comprise top, bottom, and outer sidewalls for receiving and retaining therebetween the first and second display portions of the foldable mobile electronic device.

In example embodiments, the inner edges of the first and second shell portions are unobstructed so as to provide an opening or clearance to slide the first and second shells over the first and second display portions, respectively.

In example embodiments, the axes of rotation move laterally as the first and second shell portions are pivoted.

In example embodiments, one or both of the first and second shell portions comprise discrete sections of different materials.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1 is a perspective view of a foldable electronic device case in a first, closed configuration according to an example embodiment of the present invention.

FIG. 2 is an exploded perspective view of the foldable electronic device case of FIG. 1 in a second, open configuration.

FIG. 3A is a top view of the foldable electronic device case of FIG. 1 in the first, closed configuration.

FIG. 3B is a top view of the foldable electronic device case of FIG. 1 in an intermediate configuration between the first, closed and second, open configurations.

FIG. 3C is a top view of the foldable electronic device case of FIG. 1 in the second, open configuration.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIG. 1 shows a foldable electronic device case 100 with a foldable mobile electronic device retained therein. In this disclosure, a foldable mobile electronic device refers to a mobile electronic device, such as a smartphone, tablet, or the like, with a plurality of body portions or housings operably connected to one another by a hinge or hinge-like mechanism allowing the device to be opened and closed like, for example, a book or a clam-shell. For example, the mobile electronic device may be reconfigurable between a first, closed or folded configuration and a second, open or unfolded configuration.

For purposes of this disclosure, the foldable mobile electronic device includes two body portions or housing units connected by a hinge or flexible connector. For example, the foldable mobile electronic device includes a first device body hingedly connected to a second device body. Each of the first and second device bodies comprises a peripheral minor surface or edge defining an outer or exterior major surface on one side of the device body and an inner or interior major surface on the opposite side of the device body. Typically, at least one of the inner or outer major surfaces includes or defines a user interface, such as for example a touch screen or a display. The two device bodies are connected by a hinge or flexible connector so that the device bodies can be folded over and unfolded as desired. In other words, the first and second bodies of the mobile electronic device are hingedly connected to each other which allows the foldable electronic device to be reconfigured between a closed configuration and an open configuration. In the closed configuration, the electronic device is deformed so that inner major surfaces of the first and second device bodies abut one another. In the open configuration, the electronic device is reconfigured or repositioned such that the first and second device bodies are positioned substantially side-by-side and the inner major surfaces of the first and second body portions are co-planar to one another. In some examples, a single continuous, bendable screen or display extends over both inner major surfaces of the device bodies providing a single continuous extended or enlarged screen in the open configuration.

FIG. 1 shows a foldable electronic device case or cover 100 secured onto a foldable mobile electronic device. The foldable electronic device case 100 generally includes a first shell or case portion 110, a second shell or case portion 140, and a third shell or hinge cover portion 170. In example embodiments, the first and second shells 110, 140 are hingedly or pivotally secured to opposing sides of the hinge cover 170. Each of the first and second shells 110, 140 generally defines a space or housing for receiving a portion of the electronic device. For example, in the depicted embodiment, the mobile electronic device includes a first device body pivotally or hingedly connected to a second device body. Each of the first and second shells 110, 140 is configured to receive and retain one of the two device bodies of the mobile electronic device. In the depicted embodiment, for example, the first shell 110 is fitted over the first body of the mobile electronic device and the second shell 140 is fitted over the second body of the mobile electronic device. In example embodiments, the hinge cover portion 170 is secured between the first and second shells and covers the hinge or hinge-mechanism of the foldable mobile electronic device.

FIG. 2 shows an exploded view of the foldable electronic device case 100 in an open configuration. In example embodiments, the first or front shell 110 and the second or rear shell 140 each comprise one or more frame portions. For example, the first shell 110 comprises an outer frame portion 120 and an inner frame portion 130, and the second shell 140 comprises an outer frame portion 150 and an inner frame portion 160. In example embodiments, the first and second shells 110, 140 are generally configured to match or align with the profile of the first and second device bodies so that the outer frame portions 120 and 150 substantially encase or wrap around the exposed edges or minor surfaces of the foldable electronic device. For example, the outer frame portions 120 and 150 may comprise grooves or channels configured for receiving the exposed peripheral edges of the first and second electronic device bodies. In other words, the outer frame portions 120 define raised top, bottom, and outer sidewalls 112, 114, and 116 and the outer frame portion 150 defines raised top, bottom, and outer sidewalls 142, 144, and 146. In example embodiments, the raised top, bottom, and outer sidewalls are configured to retain the electronic device therebetween. The inner frame portions 130 and 160, on the other hand, make up only portions of the top and bottom sidewalls and define openings or clearances 118 and 148 generally opposite the raised outer sidewalls 116 and 146. In application, the open sides or openings 118 and 148 allow the first and second device bodies of the electronic device to be slipped therethrough when securing the first and second shells over the respective device bodies of the electronic device. Optionally, in some example embodiments, the sidewalls are formed of materials providing a degree of flexibility or resilience for example to allow the shells to be snap-fitted onto the electronic device and retained in place with a closely engaging fit.

In example embodiments, the first and/or second shells 110, 140 may further comprise a base or back panel to cover or protect the outer major surfaces of the first and second device bodies. In the depicted embodiment, for example as best shown in FIGS. 1 and 2, the second shell 140 comprises a base panel 166. In application, the base panel 166 provides cover to the outer or exterior major surface of the electronic device when secured to the second shell 140. In example embodiments, the base panel 166 is an extension of the inner frame portion 160. However, the base panel may be an extension of the outer frame portion 150. In example embodiments, the base panel may comprise one or more openings 168 for alignment with one or more features of the electronic device for which the case 100 is configured for use, such as for example a camera, flash unit, controls, displays or screens and/or other like features.

In some example embodiments, one or more shells may be provided without a base panel, such as for example first shell 110 as shown in FIG. 2. In application, the base panel may not be required or desired if it is desirable for the outer or exterior surface of the electronic device to be exposed or remain accessible even when the device case 100 is employed.

In example embodiments, the outer frames and inner frames may also comprise one or more apertures or openings for alignment with one or more features of the electronic device for which the case 100 is configured for use, such as for example speakers, ports, microphones, switches, buttons, and/or other like features. For example, apertures 128 and 158 are provided along outer frames 120 and 150 to provide access to buttons, switches, and ports, and provide openings for speakers and microphones. In some example embodiments, the front and rear shells 110, 140 may also include one or more interactive features such as buttons configured to cooperate with control features provided on the electronic device such as the volume controls and power button.

In example embodiments, the inner frame portions further comprise one or more apertures or grooves for removably engaging and securing the hinge cover portion 170 to the case shells 110 and 140. For example, as shown in FIG. 2, the inner frame portion 130 of first shell 110 comprises a pair of shell retaining grooves or slots 132, and the inner frame portion 160 of second shell 140 comprises a pair of shell retaining grooves or slots 162. In example embodiments, the retaining grooves 132 and 162 are curvilinear or arcuate in shape and radial with respect to the edges or ends of inner frames 130 and 160 opposite the outer frames 120 and 150, respectively. In other words, the curvilinear retaining slots 132 are concave relative to the free or inner end of the first shell 110 or convex relative to the outer frame 120. Similarly, the retaining slots 162 are concave relative to the free or inner end of the second shell 140 or convex relative to the outer frame 160.

In example embodiments, the inner frame portions 130 and 160 may further comprise inclined slots 134 and 164 which connect to the arcuate retaining slots 132 and 162, respectively. The inclined slots 134 and 164 provide incline surfaces to help ease and guide the engagement protrusions 178' and 178" of hinge cover 170 to slide into engagement with the arcuate slots 132 and 162, respectively, as described further below.

The hinge cover portion 170 is generally an elongate member with end walls extending transversely from opposing top and bottom ends of the hinge cover. In example embodiments, the hinge cover portion 170 comprises at least one pair of axially aligned protrusions with one protrusion provided on the top end wall of the hinge cover and another protrusion provided on the bottom end wall of the hinge cover. In the depicted embodiment, for example, the hinge cover 170 comprises two pairs of axially aligned protrusions or engaging members 178' and 178". In example embodiments, each pair of protrusion is intended or configured to engage a pair of retaining slots or engagement features provided on the inner frame portions. For example, as shown in FIGS. 3A-3C, the pair of protrusions 178' are configured to engage the pair of retaining slots 132 of first shell 110 and the pair of protrusions 178" are configured to engage the pair of retaining slots 162 of second shell 140 as hinge cover 170 is secured or joined to the first and second shells 110, 140.

In example embodiments, the inner frame portions 130 and 160 and the hinge cover 170 are made from substantially rigid, impact-resistant and scratch-resistant materials such as for example polycarbonate, polyethylene, polypropylene, or the like. In example embodiments, the outer frame portions 120 and 150 are made from flexible, impact-absorbing or elastomeric materials, such as for example natural or synthetic rubber, silicone elastomers, thermoplastic elastomers (TPE) or the like to function essentially as bumpers to protect the outer edges of the electronic device in case of accidental drops and other potential damages to the outer edges. In example embodiments, the inner and outer frame portions of the first and second shells are integrally joined or molded together. In other example embodiments, the inner and outer frame portions 120, 130 may be uniformly made from any suitable material or materials, including for example polycarbonate, polyethylene, polypropylene, natural or synthetic rubbers, silicone elastomers, and the like or any combination thereof. In preferred embodiments, the first and second shells 110 and 140 are transparent or translucent.

According to example methods of use, the foldable electronic device case 100 provides a protective cover or casing for a foldable mobile electronic device with two hingedly connected device bodies. As shown in FIGS. 3A-3C, the foldable electronic device case 100 is reconfigurable between a fully closed configuration (FIG. 3A), a fully open configuration (FIG. 3C), and intermediate configurations therebetween (FIG. 3B). In examples methods of use, the first shell 110 is secured to the first device body by first aligning an outer side edge of the first device body to the unobstructed or free side 118 of the first shell 110 and sliding the first shell over the first device body until the outer edges of the first device body are snugly retained between all three of the top, bottom, and outer sidewalls 112, 114, 116. Similarly, the second shell 140 is secured to the second device body by first aligning the outer side edge of the second device body to the unobstructed or open side 148 of the second shell 140 and then sliding the second shell over the second device body until all three of the top, bottom, and outer sidewalls 142, 144, 146 are in immediate contact with the outer edges of the second device body. With the electronic device case 100 in the closed configuration, the hinge cover 170 is secured to the first and second shells 110, 140 by first aligning the protrusions 178' and 178" to the respective inclined slots 134 and 164 on the first and second shells 110, 140 and then pressing the hinge cover towards the first and second shells. When the hinge cover is pressed towards the shells, the protrusions slide atop the inclined surfaces of the incline slots 134, 164 until the protrusions 178' and 178" fall or snap into their respective retaining slots 132 and 162 and the hinge cover effectively snaps into engagement with the first and second shells.

Once the protrusions 178' and 178" snap into engagement with the arcuate retaining slots 132 and 162, movement of the first and second shells are restrained by the slots. According to example modes of use, the arcuate oblong shape of the retaining slots allow both pivotal and translational movement of the first and second shells during manipulation between the closed and open configuration but prevent the shells from sliding off or moving laterally in the closed and open configurations. Preferably, to limit or minimize lateral movements (i.e., rattling) of the shells 110 and 140, the retaining slots are preferably dimensioned and shaped so that there are only tight or minimal gaps between the protrusions and retaining slots in use.

In use, the first and second shells 110, 140 are constrained to pivot about axes of rotation distal from the projections and arcuate retaining slots. For example, as shown in FIG. 3A, first shell 110 comprises a first axis of rotation 111 distal from the arcuate retaining slot 132 and projection 178'. Similarly, the second shell 140 comprises a second axis of rotation 141 distal from the arcuate retaining slot 162 and projects 178". As shown throughout FIGS. 3A-3C, the axes of rotation 111 and 141 move laterally away from hinge cover 170 and, briefly away from each other, as the foldable device case is manipulated from the closed configuration to the open configuration. Conversely, the axes of rotation move laterally towards the hinge cover 170 as the foldable device case is manipulated from the open configuration to the closed configuration. In operation, the axes of rotation move substantially synchronously with one another and remain substantially parallel to one another and the hinge cover throughout operation. Accordingly, in some example embodiments, the case does not open and close about a single hinge axis, and there is no hinge axis mutual to the first and second shells; and the axes of rotation of the first and second shells are not fixed in position, but instead move through a range of positions as the case is opened and closed. In other words, the axes of rotation translate along a path that is substantially perpendicular or transverse to the hinge cover as the case is opened and closed.

While the invention has been described with reference to example embodiments, it will be understood by those skilled in the art that a variety of modifications, additions and deletions are within the scope of the invention, as defined by the following claims.

What is claimed is:

1. An electronic device case, comprising:
   a first shell comprising a first outer frame portion defining a first outer edge, a first inner frame portion defining a first inner edge opposite the first outer edge, and at least one first hinge slot oriented radially inward toward the first inner edge;
   a second shell comprising a second outer frame portion defining a second outer edge, a second inner frame portion defining a second inner edge opposite the second outer edge, and at least one second hinge slot oriented radially inward toward the second inner edge; and
   a hinge cover connecting the first and second shells to one another, the hinge cover comprising at least one first hinge protrusion configured for cooperative engagement with the at least one first hinge slot, the hinge cover further comprising at least one second hinge protrusion configured for cooperative engagement with the at least one second hinge slot,
   wherein the electronic device case is reconfigurable between a closed configuration and an open configuration.

2. The electronic device case of claim 1, wherein the hinge cover extends between a first end and a second end, the hinge cover comprising transverse walls extending transversely from each of the first and second ends, the transverse walls comprising at least one pair of axially aligned hinge protrusions.

3. The electronic device case of claim 1, wherein the hinge slots are arcuate in shape and substantially radially oriented relative to the inner edges of the first and second shells.

4. The electronic device case of claim 1, wherein the first shell rotates relative to the hinge cover about a first hinge axis, and wherein the second shell rotates relative to the hinge cover about a second hinge axis, and wherein the first and second hinge axes are spaced a distance from the hinge slots.

5. The electronic device case of claim 1, wherein the first and second hinge axes translate laterally through a range of axis locations as the electronic device case is reconfigured between the first, closed configuration and the second, open configuration.

6. There electronic device case of claim 1, wherein at least one of the first shell, second shells, or hinge cover is transparent or translucent.

7. The electronic device case of claim 1, wherein the outer frame portions comprise elastomeric materials and the inner frame portions comprise rigid materials.

8. A folding case for a foldable mobile phone, comprising:
   a hinge cover comprising a first and a second pair of axially aligned projections;
   a first shell comprising a first outer frame portion defining a first outer edge, a first inner frame portion defining a first inner edge opposite the first outer edge, a peripheral sidewall, and a first pair of elongate slots provided along the peripheral sidewall for receiving the first pair of axially aligned projections, the first pair of elongate slots oriented radially inward toward the first inner edge; and
   a second shell comprising a second outer frame portion defining a second outer edge, a second inner frame portion defining a second inner edge opposite the second outer edge, a base panel, a peripheral sidewall, and a second pair of elongate slots provided along the peripheral sidewall for receiving the second pair of axially aligned projections, the second pair of elongate slots oriented radially inward toward the second inner edge, wherein the first shell is pivotable about a first pivot axis distal from the first pair of axially aligned projections and the second shell is pivotable about a second pivot axis distal from the second pair of axially aligned projections.

9. The folding case of claim 8, wherein the outer frame portions comprise elastomeric materials and the inner frame portions comprise rigid materials.

10. The folding case of claim 8, wherein the first and second shells are translucent or transparent.

11. The folding case of claim 8, wherein the second shell further comprises a base panel.

12. The folding case of claim 8, wherein the peripheral sidewalls comprise one or more apertures for accessing user interactive features on the foldable mobile phone.

13. The folding case of claim 8, wherein the folding case is reconfigurable between a closed configuration and an open configuration.

14. The folding case of claim 13, wherein the pivot axes move laterally away from the hinge cover as the folding case is manipulated from the closed configuration to the open configuration.

15. The folding case of claim 13, wherein the first and second pivot axes move laterally toward the hinge cover as the folding case is manipulated from the open configuration to the closed configuration.

16. A foldable protective cover for foldable mobile electronic device with a first display portion hingedly connected to a second display portion, the foldable protective cover comprising first shell and second shell portions for fitting over the first and second display portions of the foldable mobile electronic device, respectively, each of the first and second shell portions comprising inner and outer edges wherein the inner edges of the first and second shell portions are rotatably connected to a third shell portion, the first and second shell portions comprising arcuate openings for receiving projections extending from the third shell portion, wherein each of the first and second shell portions further comprise an axis of rotation spaced a distance away from the arcuate openings and projections, and wherein the arcuate opening of the first shell portion is oriented radially inward toward the inner edge of the first shell portion and the arcuate opening of the second shell portion is oriented radially inward toward the inner edge of the second shell portion.

17. The foldable protective cover of claim 16, wherein the outer edges comprise top, bottom, and outer sidewalls for receiving and retaining therebetween the first and second display portions of the foldable mobile electronic device.

18. The foldable protective cover of claim 16, wherein the inner edges of the first and second shell portions are unobstructed so as to provide an opening to slide the first and second shells over the first and second display portions, respectively.

19. The foldable protective cover of claim 16, wherein the axes of rotation move laterally as the first and second shell portions are pivoted.

20. The foldable protective cover of claim 16, wherein the first and second shell portions each comprise discrete sections of different materials.

* * * * *